(12) United States Patent
Isaksson et al.

(10) Patent No.: US 8,257,562 B2
(45) Date of Patent: Sep. 4, 2012

(54) WETTABILITY SWITCH

(75) Inventors: Joakim Isaksson, Norrköping (SE); Nathaniel Robinson, Linköping (SE); Magnus Berggren, Vreta Kloster (SE)

(73) Assignee: Acreo AB, Kista (SE)

( * ) Notice: Subject to any disclaimer, the term of this patent is extended or adjusted under 35 U.S.C. 154(b) by 1190 days.

(21) Appl. No.: 10/581,487

(22) PCT Filed: Dec. 2, 2004

(86) PCT No.: PCT/SE2004/001779
§ 371 (c)(1),
(2), (4) Date: May 29, 2008

(87) PCT Pub. No.: WO2005/053836
PCT Pub. Date: Jun. 16, 2005

(65) Prior Publication Data
US 2008/0223717 A1     Sep. 18, 2008

(30) Foreign Application Priority Data
Dec. 2, 2003   (SE) ........................................ 0303245

(51) Int. Cl.
*C25B 11/04*     (2006.01)
*C25B 7/00*      (2006.01)

(52) U.S. Cl. ...................... 204/230.2; 204/252; 204/600

(58) Field of Classification Search ........................ None
See application file for complete search history.

(56) References Cited

U.S. PATENT DOCUMENTS
4,072,769 A    2/1978  Lidel
5,290,240 A *  3/1994  Horres, Jr. .................... 604/131
6,201,100 B1 * 3/2001  Gorkovenko et al. ........ 528/388
6,387,588 B1   5/2002  Katano et al.
2003/0142901 A1 * 7/2003  Lahann et al. ................. 385/18

FOREIGN PATENT DOCUMENTS
JP    02-142835        5/1990
WO    WO 02/071139 A1  9/2002
WO    WO 03/055590 A2  7/2003
WO    WO 03/056641     7/2003

OTHER PUBLICATIONS

Kwang-Seok Yun et al., "A Micropump Driven by Continuous Electrowetting Actuation for Low Voltage and low Power Operations", IEEE, pp. 487-490 (2001).
Junghoon Lee et al., "Electrowetting and electrowetting-on-dielectric for microscale liquid handling", *Sensors and Actuators*, A 95, pp. 259-268 (2002).
Robert A. Hayes et al., "Video-speed electronic paper based on electrowetting", *Nature*, vol. 425, pp. 383-385 (Sep. 25, 2003).
H.J.J. Verheijen et al., "Reversible Electrowetting and Trapping of Charge: Model and Experiments", *Langmuir*, 15(20), pp. 6616-6620 (1999).
B.J. Feenstra et al., "P-51: A reflective display based on electrowetting: principle and properties", *IDRC*, (2003).

* cited by examiner

*Primary Examiner* — Harry D Wilkins, III
(74) *Attorney, Agent, or Firm* — Harness, Dickey & Pierce, P.L.C.

(57) ABSTRACT

The present invention relates to a wettability switch that comprises an electrochemically active element having a wetting surface with switchable wetting properties. The electrochemically active element comprises an electrochemically active polymer, and surface active molecules each having a lyophobic portion and a lyophilic portion. In the wettability switch, each of said surface active molecules exposes one of said lyophobic portion and said lyophilic portion towards said wetting surface, and the identity of said portion depends on an electrochemical state of said polymer.

20 Claims, 11 Drawing Sheets

WETTABILITY SWITCH

FIELD OF THE INVENTION

The present invention relates to a wettability switch, and in particular to such a switch that provides for improved switching capabilities and ease of manufacturing.

TECHNOLOGICAL BACKGROUND

The prospect of controlling the wetting properties (so-called wetting control) of solid surfaces are currently attracting much focus. There are a vast number of envisaged applications, including bioscience (e.g. cell-growth control and selective adsorption of biomaterial), micro-fluid control (e.g. controllable gates and fluid propulsion) and printing techniques (e.g. updatable printing plates).

The wetting properties of a solid surface can be classified on a scale between lyophobic and lyophilic. A lyophilic surface is a surface that attracts liquids whereas a lyophobic surface rejects liquids. A sub-class of the lyophobic and lyophilic conception is denoted hydrophobic and hydrophilic, respectively, and is restricted to wetting properties for water only. Another sub-class of the lyophobic and lyophilic conception is denoted lipophobic and lipophilic, respectively, and is restricted to wetting properties for oils only (in fact, a lipophilic surface is typically hydrophobic at the same time, and vice versa).

The wetting properties can be measured as the contact angle θ of a liquid drop on a solid surface. The wetting properties exhibited by a liquid on a solid surface depend to a large degree on the surface tension γ experienced by the liquid on that surface. The contact angle θ of a droplet on a surface can be estimated using the Young-Dupré equation $$\gamma_{sv} = \gamma_{sl} \gamma_{lv} \cos\theta$$

where $\gamma_{sv}$, $\gamma_{sl}$ and $\gamma_{lv}$ are the surface tensions of the solid-vapor, solid-liquid and liquid-vapor interface, respectively. Obviously, a large contact angle corresponds to a lyophobic surface and a small contact angle corresponds to a lyophilic surface.

There are two conceptually different approaches for controlling the wetting properties of a surface; either the intrinsic surface properties are changed (i.e. between lyophobic and lyophilic), or the liquid behavior is manipulated by electrostatic forces.

In the first case, changing a surface from lyophilic to lyophobic will generally result in liquid-repelling effect and changing a surface from lyophobic to lyophilic will generally result in a liquid-attracting effect. A number of alternative approaches have been suggested for controlling the intrinsic wetting properties, including temperature, light, and electrochemical and chemical reactions.

In the second case, the droplet is exposed to electrostatic forces that counteract the lyophilic or lyophobic forces of the surface and that thus move the droplet from a lyophilic surface towards a lyophobic surface, or vice versa.

A surface having reversibly switchable intrinsic wetting properties has been described in the article "A Reversably Switching Surface" (by Lahann et al, Science, vol 299, 17 Jan. 2003). Described therein is an approach for dynamically controlling interfacial wetting properties using conformational transitions of surface-confined molecules. This is attained using a self-assembled monolayer of (16 Mercapto) hexadecanoic acid on an aluminum substrate. The molecular layer acts as a surfactant, and each molecule is thus controllable between a hydrophobic and a moderately hydrophilic state. To this end the molecule arrangement was selected in order to ensure a sufficient spatial freedom for each molecule.

Each molecule in the monolayer contains a so-called anchor (the mercapto part) that is attached to a hydrophobic alkyl chain that is capped by a hydrophilic carboxylate group. In their pristine states, the molecules in the monolayer are pointing their hydrophilic carboxylate groups toward the outer surface, which thus exhibits a hydrophilic property. However, in case the aluminum substrate is positively charged, the carboxylate groups (negatively charged) are attracted toward the substrate and the hydrophobic alkyle chains are instead somewhat exposed, turning the surface moderately hydrophobic. In effect, the wetting properties of the surface can be controlled by means of an electric potential.

However, the technique described in the above article is somewhat restricted. First, there are severe restrictions on the molecule monolayer regarding the molecule properties as well as the molecule density. Second, the switching is dynamic in the sense that the wetting properties always return to the initial state upon removal of the electric potential. Third, the device described is not easily adapted for large-scale and cost-effective manufacturing since it requires fairly complicated manufacturing processes and since the material choices are severely restricted. Fifth, the surface switching is between hydrophobic and only moderately hydrophobic. Consequently, the technique is not applicable to applications requiring clearly hydrophilic surfaces.

It is therefore an object of the present invention to provide a wettability switch that facilitates cost-effective large-scale manufacturing. In addition, it is a general object of the present invention to provide a wettability switch that exhibits improved switching capabilities compared to prior known devices.

SUMMARY OF THE INVENTION

To this end the inventors have surprisingly realized that surfaces having clearly switchable wetting properties can be provided utilizing an electrochemically active polymer that comprises surface active molecules. As it turns out, the electrochemical state of the polymer affects the orientation of the surface active molecules, resulting in a notable switch between lyophilic and lyophobic surface properties when switching the polymer between a reduced state and an oxidized state.

Thus, one aspect of the present invention provides a wettability switch that comprises an electrochemically active polymer element having a wetting surface with switchable wetting properties. To this end, the polymer element comprises an electrochemically active polymer and surface active molecules that each have a lyophobic portion and a lyophilic portion. The surfactant molecules expose one of the lyophobic portion and the lyophilic portion towards the wetting surface the identity of which depending on an electrochemical state of said polymer. Thereby, the wetting properties of the wetting surface are switchable simply by switching the electrochemical state of the polymer element.

The wettability switch has obvious advantages compared to prior art, for example:
  Electrochemically active polymers are well known, easy to handle, and cheap. Polymer devices are easily designed and manufactured in large-scale production lines, for example using ordinary printing techniques.
  There are a large number of possible structures available for creating and controlling the electrochemical state of a polymer. Basically, any one of these structures, or any structure yet to come, can be employed. In particular, structures providing for stable or bi-stable electrochemical states are easily provided for, and obviously provide for equally stable or bi-stable wetting properties.

The electrochemical state at the wetting surface can be switched reversibly. If an applied voltage polarity is reversed, the electrochemical state of the wetting surface is changed. Switching is furthermore provided for using comparatively low voltages, which simplifies the driving and control of the wettability switch.

The wettability switch according to the present invention facilitates the use of a solid state electrolyte and thus allows for all-dry updating of the wetting properties.

The wetting properties can be switched gradually over a surface, thus creating a wettability gradient having continuously varying wetting properties. The steepness and the degree of wettability along the wettablilty gradient can be controlled, for example, by tuning of the electrochemical ground state in the wetting surface (i.e. before the wettability gradient is formed).

As described above, the wettability of a liquid on a solid surface in a gas environment (such as air) is closely connected to the surface energy of the respective medium. In fact, the wettability switch provided for by the present invention is actually a surface energy switch in the sense that the surface energy of the wetting surface is switched depending on the orientation of the surface active molecules. Consequently, the invention also relates to a surface energy switch and when in the following it is referred to a wettability switch this genus can be exchanged for a surface energy switch. A surface energy switch is useful in case the wetting surface (or, rather, the surface having switchable surface energy) should interact with entities that respond to the surface energy but not necessarily to the wettability as such. In essence, the wettability switch according to the present invention generally relates to a device having electrochemically switchable interfacial properties.

In the context of the present invention, an electro-chemically active polymer refers to any polymer, which is susceptible to electrochemistry that alters a redox state of said polymer. When reference is made to changes in the "redox state" of the electrochemically active polymer, this is intended to include cases where the polymer is either oxidised or reduced, as well as cases where there is a redistribution of charges within the polymer, so that one end is reduced and the other end is oxidised. In the latter case, the polymer as a whole retains its overall redox state, but its redox state has nevertheless been changed according to the definition used herein, due to the internal redistribution of charge carriers.

There are a wide range of electrochemically active polymers that can be employed for the present invention.

Examples of feasible polymers include PANI (polyaniline) and PEDOT (polyethylenethioxythiophene).

A vast number of electrochemically active polymers are in fact electrochromic in the sense that they change optical appearance in response to electrochemical reactions. This property is of course not necessary for the present invention, but electrochromic reactions accompanying the electrochemical reaction are advantageous for some applications since the wetting property can then be estimated based on the optical appearance of the wetting surface.

The wettability switch can be supported or it can be self-supporting. A supported wettability switch is typically supported by some type of carrier substrate on which the electrochemically active polymer element is arranged. The support can have many different shapes and can be formed out a vast number of materials. According to some embodiments of the invention the material is selected from the group consisting of polyethylene terephthalate; polyethylene naphthalene dicarboxylate; polyethylene; polypropylene; paper; coated paper, e.g. coated with resins, polyethylene, or polypropylene; paper laminates; paperboard; corrugated board; glass and polycarbonate.

Another alternative for the carrier substrate is a metal foil laminated on a carrier, or a sheet of metal. The metal can be patterned or un-patterned, and may optionally form part of a drive circuitry for controlling the wetting surface In case the wettability switch is self-supporting, one or more of the components are rigid enough to carry the switch as an integral piece. This can be achieved by suitable choice of material and dimensions for the electrochemically active polymer element.

The surface active molecules are selected so as to provide the switchable wetting properties of the wetting surface, and must thus respond to electrochemical reactions occurring in the electrochemically active polymer. To this end the surface active molecules must have lyophobic and lyophilic portions and a sufficient mobility at the polymer surface (i.e. the wetting surface) in order to respond to electrochemical changes in the polymer. Preferably the surface active molecules are such that they constitute counter-ions in the polymer and thus participate actively in the electrochemical reaction as such, by ionic interaction with the electrolyte. Thus, according to one embodiment, the surface active molecules constitute counter-ions in the electrochemically active polymer. In such case, the surface active counter-ions are preferably doped in the electrochemically active polymer.

The surface active molecules can be supplied to the electrochemically active polymer in many different ways, for example by spin-coating or as molecular monolayers (langmuire blodget films) defining the wetting surface on the polymer element. Another alternative is to dope the electrochemically active polymer with the surface active molecules. This can be achieved by electrochemical replacement or introduction of the desired molecules. Further alternatives involve chemical or physical blending of the electrochemically active polymer with the surface active molecules.

In order to provide for the electrochemical reactions, the wettability switch must have an electrochemically active surface that is susceptible to electrochemistry when exposed to an electric potential via an electrolyte element. The electrolyte element may form part of the switch or it may be a separate element that is applied at will whenever the switch is to be switched. Thus, according to one embodiment, the wettability switch further comprises an electrochemically active surface that is susceptible to electrochemistry when brought in contact with an electrolyte element. In effect, the electrochemically active surface is operative to exchange ions with an applied electrolyte element provided that an electric potential is present across the surface.

According to one embodiment, the electrochemically active surface and the wetting surface are separate from each other. This is advantageous for many applications, since the wetting surface can be open for liquid interaction without removing the electrolyte element. This advantage is typically difficult to provide for using prior purely electrochemical switching of the wetting properties since the limited switching effect that does occur typically is restricted to the very surface that interfaces the electrolyte element.

The electrochemically active polymer element is typically provided as a film or a layer, and thus defines two opposing surfaces. In such a case, the electrochemically active surface and the wetting surface can be provided one on each of these opposing surfaces. Thus, according to one embodiment, the electrochemically active surface and the wetting surface reside on opposite sides of said polymer element. Thereby, the switching can be controlled from a surface that is totally separate from the wetting surface, leaving the wetting surface open for continuous operation. This facilitates switching operations even when the wetting surface is in operation and thus exposed to a liquid. In case a rapid switching behaviour is desired the film or layer of electrochemically active polymer is preferably relatively thin, e.g. between 50 nm and 10 micrometer.

However, the electrochemically active surface and the wetting surface may, alternatively, overlap each other. This is advantageous for example in case a very high switching resolution is required, since there will always be a minor scattering of the electrochemical reaction in the polymer element in case the electrochemistry is induced at a distance from the wetting surface. This embodiment might therefore be advantageous for example in printing applications where a high resolution is often required.

Furthermore, for some applications it is advantageous to use the "wetting liquid" (e.g. the liquid which the wetting surface interacts with and manipulates) as electrolyte. In such case the electrochemically active surface and the wetting surface should obviously be the same or at least overlapping. This is possible since a large number of potential "wetting liquids" have ion conducting properties and are thus operative as electrolytes.

However, certain "wetting liquids" (pharmaceuticals, bio materials, reactive chemicals, etc.) do not tolerate a current to be past through them (or even a potential gradient within the liquid). If exposed to an electric field, such liquids may alter their composition and their intended effect will thereby change. For these cases, separating the electrochemically active surface and the wetting surface ensures that the "wetting liquid" can be separated from the ionic current occurring in the electrolyte.

In order to provide for the electrochemical reaction that drives the wettability switch, there is thus a need for an electrolyte component. The electrochemically active polymer and the electrolyte element thus form an electrochemical system. There are a vast number of electrolytes available. For the purpose of the present invention the electrolytes can be divided into two groups: fluid electrolytes and solid electrolytes. Solid electrolytes are typically applied on the polymer in order to permanently define electrochemically active areas. A fluid electrolyte (e.g. a liquid or a gas) can more easily be applied at will and is obviously easier to remove. Depending on the application at hand, it is even possible to move a liquid electrolyte on the wetting surface by means of wetting property changes induced by the electrolyte itself. In other words, the liquid that is to be manipulated by the wettability switch (i.e. the "wetting liquid") can, for some applications, serve also as the electrolyte.

In order to provide rapid and accurate wetting control using moderate control voltages, it is important that the electrochemical reactions are easily driven and controlled. This imposes requirements on the electrolyte regarding its ion conductivity. Liquid electrolytes generally have a much higher ion conductivity than solid counterparts. However, thanks to the very pronounced switching provided for by the present invention it is possible to use electrolytes having far too low ion conductivity for use in alternative solutions that exploits purely electrochemical wetting control as provided for in the prior art. In effect, the present invention provides for a major advantage in that solid electrolytes can be used with maintained switching performance. In fact, solid electrolytes are preferred for many applications, since a permanent electrochemical and wetting characteristic can be provided for and used in an all-dry process. Thus, according to one embodiment the wettability switch further comprises a solid electrolyte element, whereby said electrochemically active polymer element and said solid electrolyte element constitute an electrochemical system.

Conjugated polymers constitute a wide class of electrochemically active polymers. In fact, conjugated polymers are not only electrochemically active but typically also electrically conductive to some extent. Thus, in case a conjugated polymer is used for the polymer element the same material can be used for forming any drive and control circuitry needed for driving and controlling the switch. Thereby the manufacturing can be simplified substantially, since the use of separate materials typically requires separate manufacturing steps and maybe even separate manufacturing equipment. In particular, in case the wettability switch is formed by printing a polymer solution on a substrate, that same printing process can be used for forming also the switch electrodes that are needed for addressing the switch.

Hence, according to one embodiment, the wettability switch further comprises electrodes formed out of the same material as the polymer element and arranged in direct electrical contact with the electrochemically active area(s). Of course, even if the electrodes are formed out of a polymer material, the electrodes themselves might be interconnected with a circuitry of different material. Thus, the polymer electrodes may very well be interconnected with, for example, metal conductors. In such a case, the polymer electrodes are constituted essentially by the polymer portions that do not normally participate in the electrochemistry and that thus retain their electrochemical state independent of the electrochemical reactions that occur when switching the wettability switch.

As an alternative, the complete electrode circuitry is formed out of a material other than the polymer element material. For example, the electrodes may be formed out of a metal. In such case, the metal can be applied, for example, in the form of metal paste (e.g. a silver or copper paste). Thus, according to one embodiment the wettability switch comprises an electrode circuitry comprising a metal. Electrodes comprising a metal typically provides for higher electrical conductivity than does polymer counterparts. This is advantageous for applications when wanting to avoid high drive voltages or for applications were there is a need to have the largest voltage drop at the electrochemically active element.

The wettability switch can be controlled in many different ways. For example, the wettability switch may be controlled using a transistor. This might be advantageous in case an array of wettability switches are to be controlled, since it is then possible to supply a common drive voltage to all switches and only a very limited control voltage is needed for addressing and de-addressing (i.e. switching) the switch. Such a transistor can advantageously be formed out of an electrochemically active polymer transistor, for example as described in WO 02071505.

Thus, according to one embodiment, the wettability switch further comprises a transistor formed out of an electrochemically active polymer material.

As indicated above, a number of wettability switches can be arranged in an array. Thereby it is possible to provide a surface having separately addressable portions, for example corresponding to picture elements of a printing plate. Thus, one aspect of the present invention provides an array of wettability switches, comprising at least two wettability switches as defined above, whereby at least two separately controllable wetting surfaces are provided in one integral device.

An array as described above can be used in, for example, a printing process. Thus, one aspect of the present invention provides a printing plate that comprises a wettability switch array as defined above.

Yet one aspect of the present invention provides a microfluidic device that comprises a wettability switch as defined above. The wettability switch can then be utilized for controlling and/or propelling a fluid in the device.

Yet one aspect of the present invention provides a cell-growth device that comprises a wettability switch as defined above. Depending on the state of the wettability switch (i.e. the wetting properties of the wetting surface), the adsorption and growth of cells can be controlled. According to one embodiment, an array of wettability switches is provided. Thereby it is possible to selectively control the cell adsorption and cell growth on each respective wetting surface.

BRIEF DESCRIPTION OF THE FIGURES

The invention will now be further described with reference to the accompanying exemplifying drawings, on which.

DETAILED DESCRIPTION

The invention will now be described in further detail. First, various structures will be described in order to exemplify the broad range of structural designs that are envisaged. Second, various materials that can be used for the invention will be discussed. Third, methods of manufacturing are discussed, and fourth, various experiments performed on test structures will be described. Finally, a number of envisaged applications for the wettability switch will be outlined.

Fundamental Structures

Even though the actual structure that is employed for a certain embodiment may take many different shapes, many of them can be categorized into one of four fundamental structures, which in the following are denoted Structure 1, Structure 2, Structure 3, and Structure 4, respectively.

Structure 1

Figure 1A:
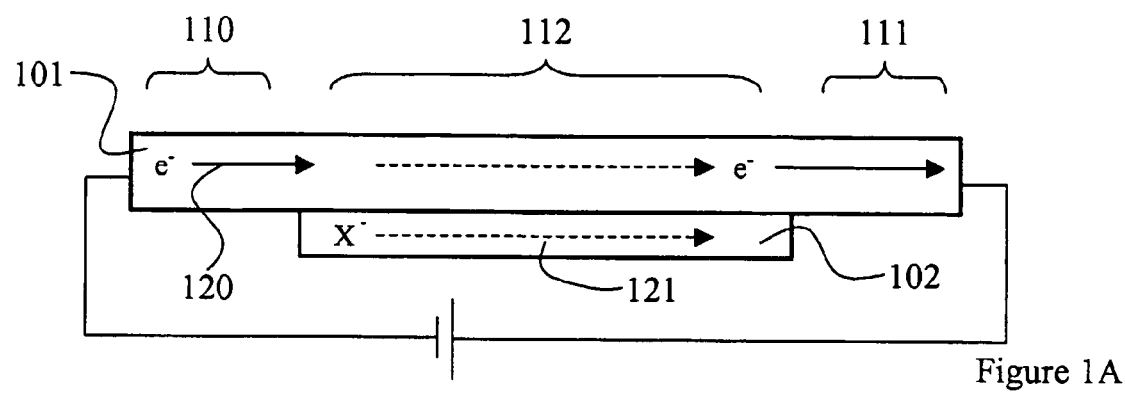
FIGS. 1-4 illustrate cross-sections of wettability switches operating according to different principles.
Figure 1B:
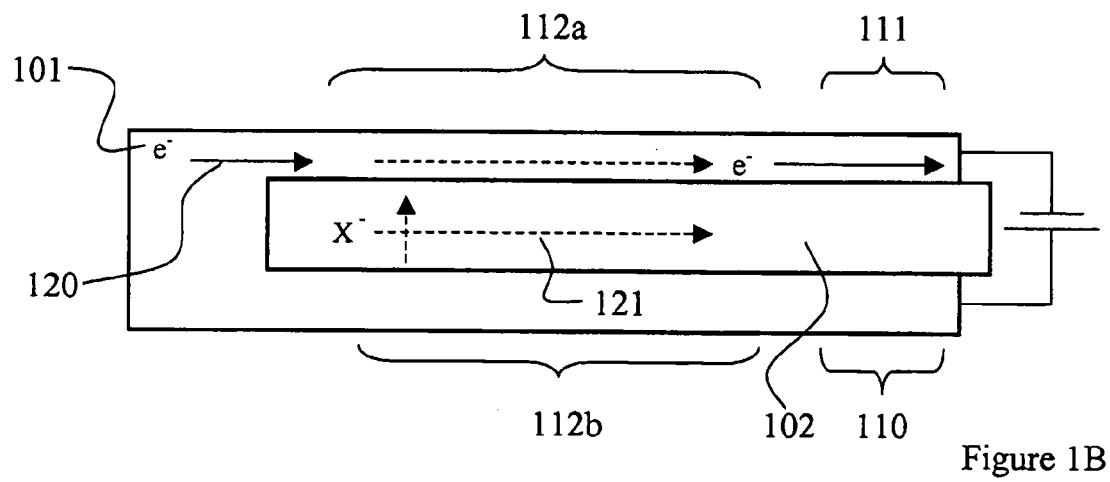

Structure 1 is illustrated by the cross-sectional views of FIGS. 1a and 1b. The structure comprises an electrochemically active polymer element 101 and an electrolyte element 102. The polymer element 101 defines two electrode portions 110, 111 and a wetting surface 112. FIG. 1a illustrates a design where the polymer element is flat, whereas FIG. 1b illustrates a design where the polymer element is bent and thus encapsulates the electrolyte.

When applying a voltage between the two electrodes, an electronic current 120 will appear in the polymer. However, the electrolyte element will then experience a potential difference at the polymer interface that induces an ion current 121 in the electrolyte element. In the figures, electronic current is illustrated by e$^-$ and ionic current is illustrated by X$^-$. Depending on the conductivities of the electrolyte and the polymer element, there might also be a complementary ionic current across the electrolyte.

The resulting electrochemistry will occur not only at the interface between the polymer layer 101 and the electrolyte 102 but will propagate in the polymer. In fact, provided that the polymer layer is sufficiently thin, the electrochemical reaction will rapidly propagate through the polymer layer and will occur at the opposite face of the layer, i.e. the wetting surface 112 (or, as in FIG. 1b, at two wetting surfaces 112a and 112b).

The electrochemistry is thus generally conditioned by an ion current in the electrode 102 complementing the electrical current in the electrochemically active polymer. Using an electrolyte having a high ion conductivity and/or using an electrochemically active polymer that has a low electrical conductivity may thus intensify the electrochemical reaction. An advantage using this type of structure is that the electrochemical reaction varies gradually across the electrochemically active polymer element, resulting in a wetting property gradient.

Due to the fact that the electrochemical system formed by the electrochemically active polymer element and the electrolyte is constantly in electronic as well as ionic contact, the wetting surface will return, by varying speeds depending on the materials used, to its initial state upon removal of the drive potential.

Structure 2

Figure 2A:
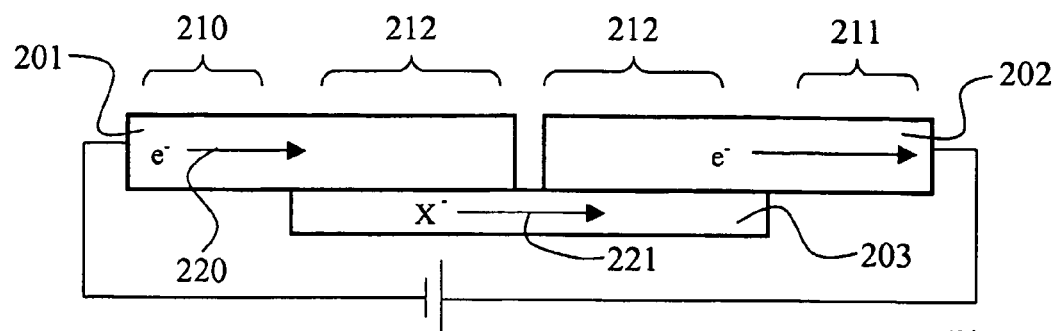
Figure 2B:
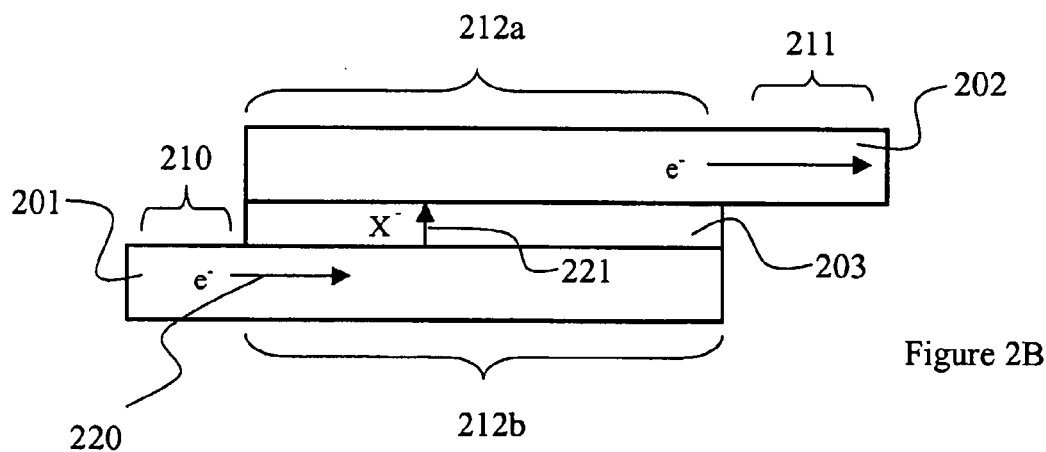

Structure 2 is somewhat similar to structure 1 in that in comprises a layer of polymer 201, 202 and an electrolyte element 203. However, the layer of polymer is divided into two separate parts, each defining an electrically separate electrode 201 and 202, respectively. The respective parts may be arranged in a common plane, as illustrated in FIG. 2a, or on opposite sides of the electrolyte, as illustrated in FIG. 2b. The electrolyte element 203 serves as an ion bridge between the respective electrodes. When applying a voltage between the electrodes 201, 202 electrochemistry is forced to occur since there is no electric contact between the electrodes. Rather, all electronic current 220 traveling from one electrode to the other must be accompanied by corresponding electrochemistry in the electrode/electrolyte interfaces and by an ionic current 221 in the electrolyte. The resulting electrochemistry is thus much more pronounced using structure 2 than using structure 1.

In case the polymer element 201, 202 are arranged in one common plane, they can be bridged by an electrically and electrochemically inert material in order to provide a homogenous surface comprising two separate wetting surfaces 212a and 212b on which a droplet can move without physical obstacle. However, unlike structure 1 there will be a distinct difference in wettability across the wetting surface. The wetting property will thus be controlled in a step-like function. This is advantageous for some applications, for example if two distinct wetting states are desired. In case the polymer elements 201, 202 are arranged on opposite sides of the electrolyte, as illustrated in FIG. 2b, each element will define a separate wetting surface 212b, and 212 a respectively. In such case the electrochemical reactions occurring at the respective wetting surfaces will by complimentary, e.g. one side will be reduced and the other side will be oxidized. Provided that the polymer elements are formed out of the same material, the respective wetting surfaces will thus typically have opposite wetting properties.

This structure provides for bi-stable electrochemical states, since no electrochemical reaction can occur upon removal of the drive potential. This is ensured by the fact that any electrochemical reaction requires both an electronic and an ionic current, and structure 2 only provides for ionic currents (through the electrolyte) and not for electronic currents (since the polymer elements 201, 202 are separate from each other).

Structure 3

Figure 3A:
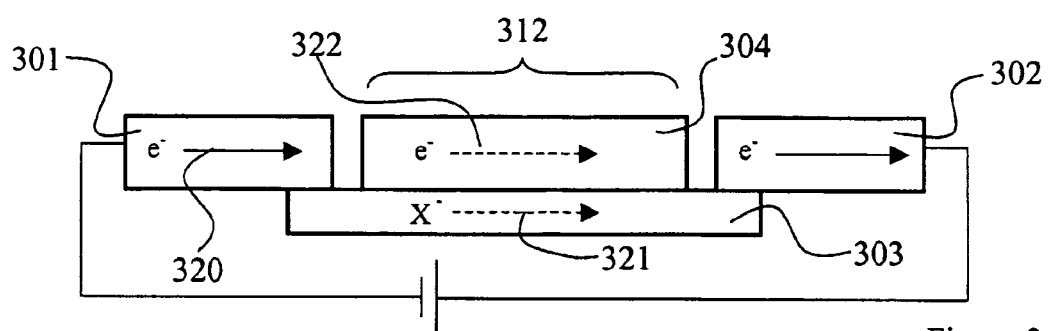
Figure 3B:
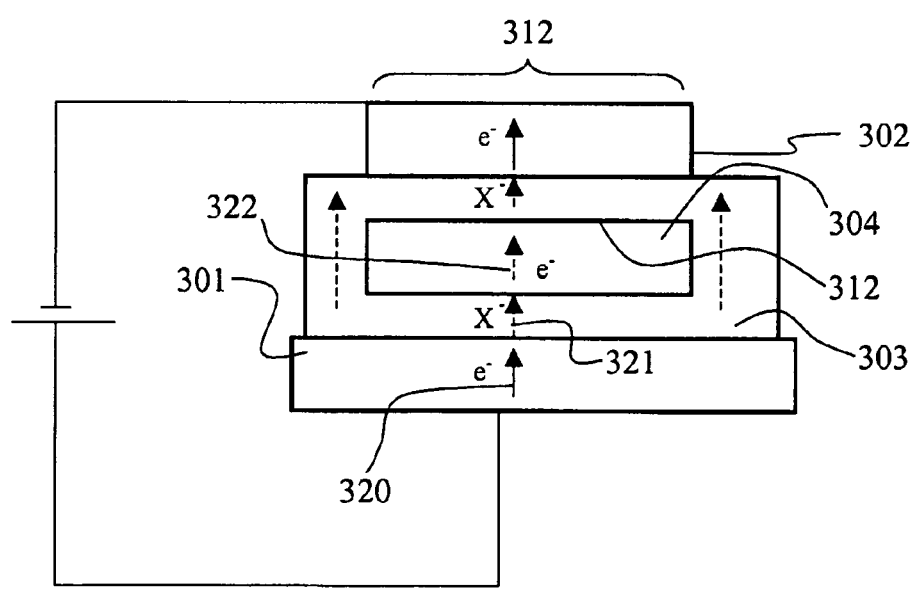

Structure 3 is illustrated in FIGS. 3a and 3b, and is, in a sense, a combination of structure 1 and structure 2. Two electrochemically active polymer electrodes 301, 302 are provided and electrochemically interconnected only by an electrolyte element 303, and an additional electrochemically active polymer element 304 is arranged between the two electrodes 301, 302. When a voltage is applied between the electrodes, an ion current 321 is thus induced in the electrolyte element 303, and the additional polymer element 304 experiences a potential difference. Electrochemistry thus occurs in the additional element 304 much like in element 101 of structure 1. The difference between the additional polymer element provided by structure 3 and the polymer element in structure 1 is that an ionic current 321 in the electrolyte induces an electric current 322 in the additional polymer element rather than the reverse as is the case in structure 1.

In the arrangement illustrated in FIG. 3a, the wetting surface 312 is typically arranged on the polymer element 322. In the arrangement illustrated in FIG. 3b, the wetting surface can be arranged on either sides of the polymer element 304. However, in this structure as well as in any other structure, any surface that is exposed for electrochemistry can be exploited as wetting surface.

Structure 3 is advantageous in that the additional polymer element 304 provides a distinct wetting surface. Actually, the electrodes 301, 302 need not exhibit switchable wetting properties, since the additional element 304 alone can provide a sufficiently large wetting surface 312. In the arrangement illustrated in FIG. 3b, an wetting property gradient can be provided in that wetting surface much like in structure 1. This wetting gradient occurs due to the potential different that naturally occurs across the wetting surface rendering oxidation at one end and reduction at the other end.

Structure 4

Figure 4A:
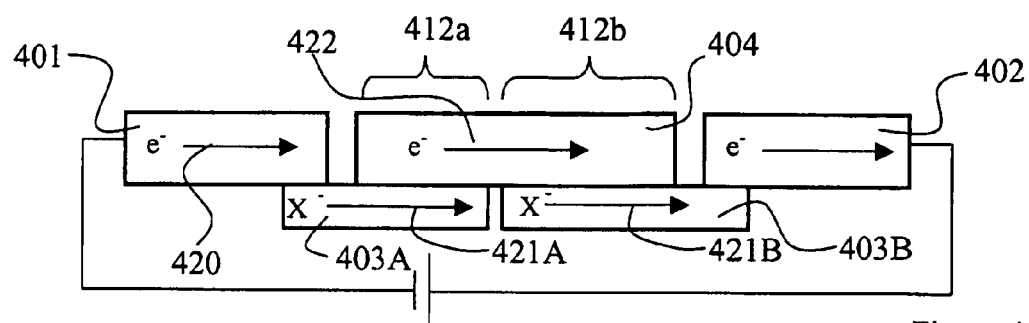
Figure 4B:
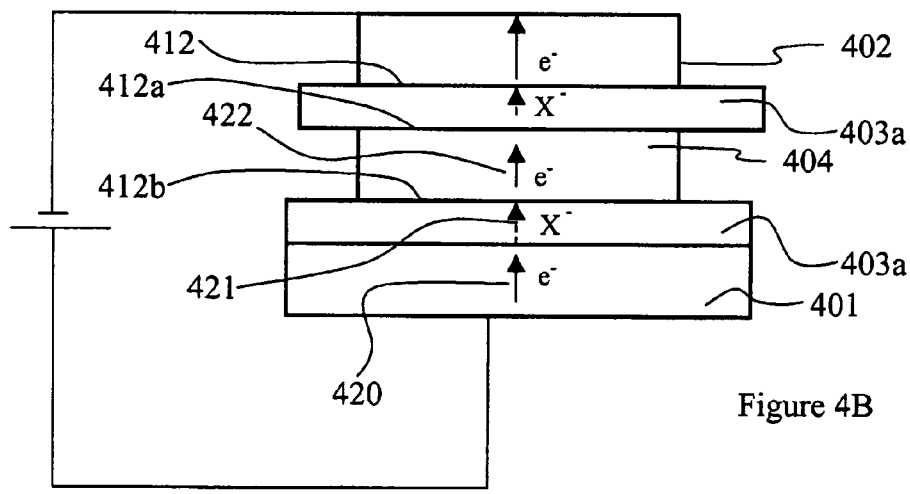

Structure 4 is illustrated in FIGS. 4a and 4b. Structure 4 is, in a sense, a combination of structure 3 and structure 2, in that two electrochemically active polymer electrodes 401, 402 are provided and in that an additional electrochemically active polymer element 404 is arranged between the two electrodes 401, 402. The electrolyte is however electrochemically interconnected by two separate electrolyte elements 403a and 403a. When a voltage is applied between the electrodes, two ion currents 421A and 421B are thus induced in the electrolyte elements 403A and 403B, and the additional polymer element 404 experiences a potential difference between its ends and functions as an electronic connector were an electronic current 422 can pass. Electrochemistry thus occurs in the additional element 404 much like in structure 3.

Structure 4 is bistable, just like structure 2. The bi-stability in structure 4 is however provided for by the interrupted ionic current (due to the separated electrolyte elements) instead of an interrupted electronic current as is the case for structure 2.

This structure is advantageous in that two electrolytes are used to alter the wetting surface. Actually, the electrodes 401, 402 need not exhibit switchable wetting properties. The additional element 404 alone can provide for switchable wetting properties since the areas 412A and 412B are oxidized and reduced in pairs. A homogenous surface (e.g. surface 412a and 412b in combination in the arrangement illustrated in FIG. 4a. The same surface, e g 404, can thereby have different wettabilities without using a gradient.

Materials

Electrochemically Active Polymer

The polymer material for use in the present must be electrochemically active and is preferably electrically conductive to some extent. Polymer materials comprising combinations of more than one polymer material, such as polymer blends and mixtures, polymer/oligomer mixtures and blends, or several layers of polymer materials, wherein the different layers consist of the same polymer or different polymers, are also contemplated.

Conjugated polymers constitute a large group of feasible polymers that are feasible for the present invention. Due to their unique properties, conjugated polymers are explored as the active material in a vast array of electrochemical devices. Conjugated polymers are solution processable and thus allow for manufacturing of devices on flexible carriers using common printing techniques. Device functionality can be tailor-made through proper choice of monomer building blocks, attachment of chemical sidegroups or simply by blending different materials.

Electrochemically active polymers for use in the wettability switch of the invention are preferably selected from the group consisting of polythiophenes, polypyrroles, polyanilines, polyisothianaphthalenes, polyphenylene vinylenes and copolymers thereof such as described by J C Gustafsson et al in Solid State Ionics, 69, 145-152 (1994); Handbook of Oligo- and Polythiophenes, Ch 10.8, Ed D Fichou, Wiley-VCH, Weinhem (1999); by P Schottland et al in Macromolecules, 33, 7051-7061 (2000); Technology Map Conductive Polymers, SRI Consulting (1999); by M Onoda in Journal of the Electrochemical Society, 141, 338-341 (1994); by M Chandrasekar in Conducting Polymers, Fundamentals and Applications, a Practical Approach, Kluwer Academic Publishers, Boston (1999); and by A J Epstein et al in Macromol Chem, Macromol Symp, 51, 217-234 (1991). In an especially preferred embodiment, the organic material is a polymer or copolymer of a 3,4-dialkoxythiophene, in which said two alkoxy groups may be the same or different or together represent an optionally substituted oxy-alkylene-oxy bridge. According to one embodiment, the polymer is a polymer or copolymer of a 3,4-dialkoxythiophene selected from the group consisting of poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, and copolymers therewith.

Figure 5:
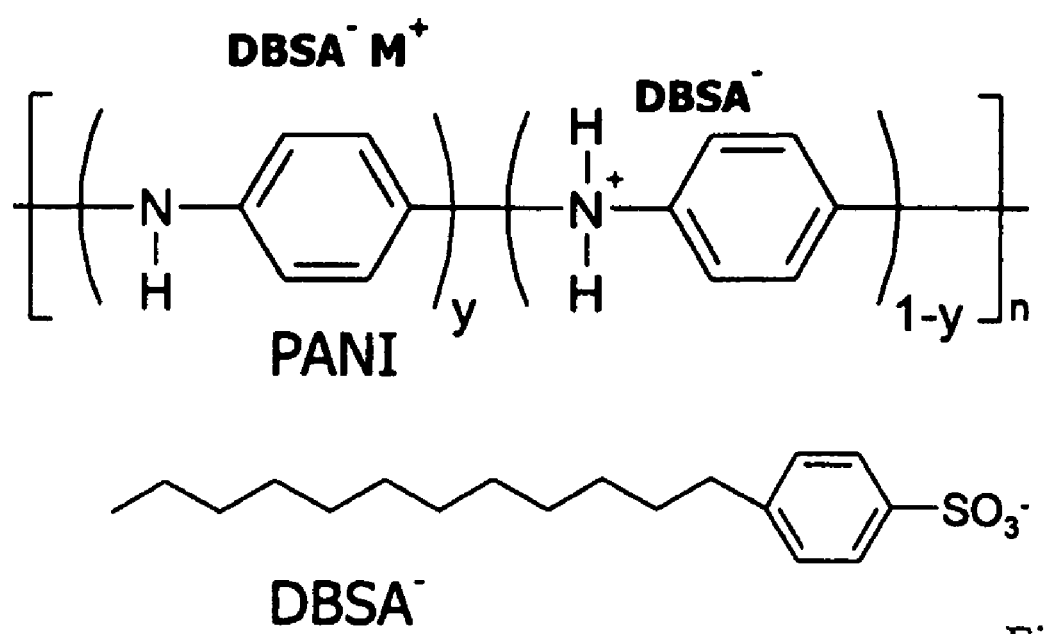
FIG. 5 illustrates the chemical formulae of PANI and DBSA$^-$.

For the purpose of the present invention, polyaniline (PANI) doped with dodecylbenzenesulfonic acid (DBSA)

has been investigated for use as the electrochemically active polymer. PANI doped with DBSA is commercially available from Panipol Ltd, for example under the trade name "Panipol T". Polyaniline is schematically illustrated in FIG. 5, and can be electrochemically switched between three different redox-states. The most conducting, green colored form of polyaniline is the emeraldine salt (or protonated emeraldine form). PANI in this state can be switched electrochemically to the oxidized blue protonated pernigraniline form or reduced to the transparent leucoemeraldine form.

Surface Active Molecules

The surface active molecules (so-called surfactant molecules) can be selected from a vast number of surfactants. A surface active molecule is generally characterized by it having a polar group and a (typically slightly larger) non-polar group. The fundamental requirement for the present invention is that the surface active molecules show either of a lyophobic and a lyophilic portion toward the wetting surface of the device, the identity of which depending on the electrochemical state of the polymer.

The surface active molecules can all be of one and the same species or they can be from a number of different species, each having different characteristics.

In some preferred cases, the surface active molecules operate as counter-ions in the electrochemical reaction. One such surfactant that has been studied in detail is dodecylbenzenesulfonic acid ($DBSA^-$).

In general, the surfactant molecules may be anionic, cathionic, non-ionic, or amphoteric. Examples from these groups are given in the following:

Anionic: Sodium linear alkylbenzene sulphonate (LABS); sodium lauryl sulphate; sodium lauryl ether sulphates Petroleum sulphonates; linosulphonates; naphthalene sulphonates, branched alkylbenzene sulphonates; linear alkylbenzene sulphonates; alcohol sulphates Cationic: Stearalkonium chloride; benzalkonium chloride quaternary ammonium compounds; amine compounds Non-ionic: Dodecyl dimethylamine oxide; coco diethanolamide alcohol ethoxylates; linear primary alcohol polyethoxylate alkylphenol ethoxylates; alcohol ethoxylates; EO/PO polyol block polymers; polyethylene glycol esters; fatty acid alkanolamides Amphoteric: Cocoamphocarboxyglycinate; cocamidopropylbetaine Betaines; imidazolines For e.g. biotechnical applications, the surface active molecules may be selected from the group consisting of: Sodium dodecylsulfate (SDS), Sodium cholate, Sodium deoxycholate (DOC), N-Lauroylsarcosine Sodium salt, Lauryldimethylamine-oxide (LDAO), Cetyltrimethylammoniumbromide (CTAB), Bis(2-ethylhexyl)sulfosuccinate and Sodium salt.

In order to operate as a counter-ion in e.g. PANI it should be negatively charged, such as sulfonic acid $SO_3^-$. However other polymers require a positively charged groups such as $NH_4^+$. Conventional surface active molecules normally comprise a small polar group and a long non-polar carbon chain (such as a fatty acid). Examples of polar groups include COOH, OH, $NO_2$, CN, and $PO_4$. Examples of non-polar groups include —$CH_2$—, —$CH_3$, and —CH=(CH)—.

Electrolytes

The electrolyte can be a solid, a liquid, or a gas.

An advantage using solid electrolytes is that they readily provide for vertical structure and that that they generally are stable over time. For the purposes of the invention, a solid electrolyte means an electrolyte, which at the temperatures at which it is used is sufficiently rigid that particles/flakes in the bulk therein are substantially immobilised by the high viscosity/rigidity of the electrolyte and that it does not flow or leak.

In the preferred case, such an electrolyte has the proper rheological properties to allow for the ready application of this material on a support in an integral sheet or in a pattern, for example by conventional printing methods or by spin-coating. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solid electrolyte preferably comprises an aqueous or organic solvent-containing gel, such as gelatine or a polymeric gel. However, solid polymeric electrolytes are also contemplated and fall within the scope of the present invention. Furthermore, the definition also encompasses liquid electrolyte solutions soaked into, or in any other way hosted by, an appropriate matrix material, such as a paper, a fabric or a porous polymer. In some embodiments of the invention, this material is in fact the support upon which the electrochemical transistor device is arranged, so that the support forms an integral part of the operation of the device.

Preferably, the solid electrolyte comprises a binder. It is preferred that this binder have gelling properties. The binder is preferably selected from the group consisting of gelatine, a gelatine derivative, polyacrylic acid, polymethacrylic acid, poly(vinyl-pyrrolidone), polysaccharides, polyacrylamides, polyurethanes, polypropylene oxides, polyethylene oxides, poly(styrene sulphonic acid) and poly(vinyl alcohol) and salts and copolymers thereof; and may optionally be cross-linked. The solid electrolyte preferably further comprises an ionic salt, preferably magnesium sulphate if the binder employed is gelatine. The solid electrolyte preferably further contains a hygroscopic salt such as magnesium chloride to maintain the water content therein.

Further examples of feasible solid electrolytes include PSS (poly(styrenesulfonate)), and various varieties of amorphous poly(ethylene glycol) (PEG). One specific solid electrolyte that has been investigated in detail is constituted by a mixture of Sericol multiprint 090, propylene carbonate, Lithium trifluoromethane sulfonate and phosphoric acid. This mixture provides for quick switching properties and is more stable than PSS for some applications involving PANI as the electrochemically active polymer.

Another alternative for use as solid electrolyte is the commercial product Nafion that is available from e.g. Sigma-Aldrich. Nation is however hygroscopically active and changes characteristics depending on the amount of absorbed moisture.

In case a liquid electrolyte is employed, common ionic solutions such as water, alcohol, or organic-based electrolytes additionally provided with soluble salts etc. can be used.

Using electrolytes having relatively low ion conductivity (so-called slow electrolytes) results in slower switching of the devices, but also in an prolonged memory effect in that the wettability switch retains its electrochemical state after removal of the electrical potential for a longer time than if a quicker electrolyte was used. A further advantage using slow electrolytes is that wettability gradients are more easily provided for, since the electrochemical reaction occurs more slowly and is thus more controllable.

Methods of Manufacturing

The wettability switch according to the invention is particularly advantageous in that it can be easily realised on a solid support, such as a polymer film or paper. Thus, the different components can be deposited on the support by means of conventional printing techniques such as screen printing, offset printing, ink-jet printing and flexographic printing, or coating techniques such as spin-coating or knife coating, doctor blade coating, extrusion coating and curtain coating, such as described in "Modern Coating and Drying Technology" (1992), eds E D Cohen and E B Gutoff, VCH Publishers Inc, New York, N.Y., USA. The electrochemically active polymer can also be deposited through in situ polymerisation by methods such as electropolymerisation, UV-polymerisation, thermal polymerisation and chemical polymerisation. As an alternative to these additive techniques for patterning of the components, it is also possible to use subtractive techniques, such as local destruction of material through chemical, electrochemical, or gas etching, by mechanical means such as scratching, scoring, scraping or milling, or by any other subtractive methods.

Furthermore, ordinary production processes used in the electronic industry may be used for manufacturing the wettability switch. Examples of such a process include ordinary lithographic methods.

However, the invention is not limited to supported devices, as the respective components can be arranged in such a way that they support each other.

Electropolymerization readily facilitates accurate control of the amount of surface active molecules in relation to the electrochemically active polymer. This is achieved by simply controlling the current and/or voltage that is applied during the electropolymerization process. Either, the surface active molecules can be doped into the polymer during polymerization, or they may be mixed into an already polymerized polymer.

A wettability switch according to the present invention could for example comprise a solid electrolyte layer, a cross-linked conducting polymer spun on top of the electrolyte layer, and an electrochemically active polymer electropolymerized on top of the conducting polymer and defining the switchable wetting surface. Thereby a wetting surface having a sufficient amount of surfactants is readily provided.

The surface topography typically affects the wetting behaviour of a surface. This fact can be exploited by patterning the surface with e.g. small spikes or canals. The polymer surface is typically soft enough to facilitate imprint of such patterns using e.g. a die stamp.

Experiments

A number of experiments have been performed in order to verify the function of the wettability switch. These experiments will be described in the following, with reference to FIGS. 6-13.

Experimental Structures

In order to further study the characteristics of wettability switches according to the present invention, experimental devices were made by first casting a polymer electrolyte layer approximately 200 micrometer thick from 400 μl of a water-solution (33% (wt/wt) poly(Sodium 4-Styrenesulfonate) (M.W. 70.000, Aldrich), 8% (wt/wt) Glycerol (87%, Merck) and 8% (wt/wt) D-sorbitol (97%, Lancaster) in de-ionized water) on a glass slide serving as substrate. The electrolyte layer was subsequently annealed at 50° C. for 10 minutes. The thereby solidified electrolyte hygroscopically absorbed a small amount of water from the environment. This absorption provided for increased ionic conductivity ensuring devices that rapidly responded to applied potential differences. PANI films were spin coated, at 1000 rpm, from a toluene solution (50% (wt/wt) PANIPOL T, in toluene), yielding a ~2000 Angstrom thick film on top of the electrolyte layer. Adjacent active polymer electrodes were defined by simply scratching the polymer film. On the active electrodes, silver contact pads were added to guarantee good electrical contact to the polymer films.

FIG. 5 illustrates PANI structural formulas with doping ratios defined as 1−y. Doped PANI contains a combination of protonated amine ($NH_2^+$) and protonated imine ($NH^+$) but only the former is shown in the figure. The PANI salt is doped intrinsically with DBSA and may therefore be either reduced (y increases) or oxidized (y decreases).

Figure 6A:
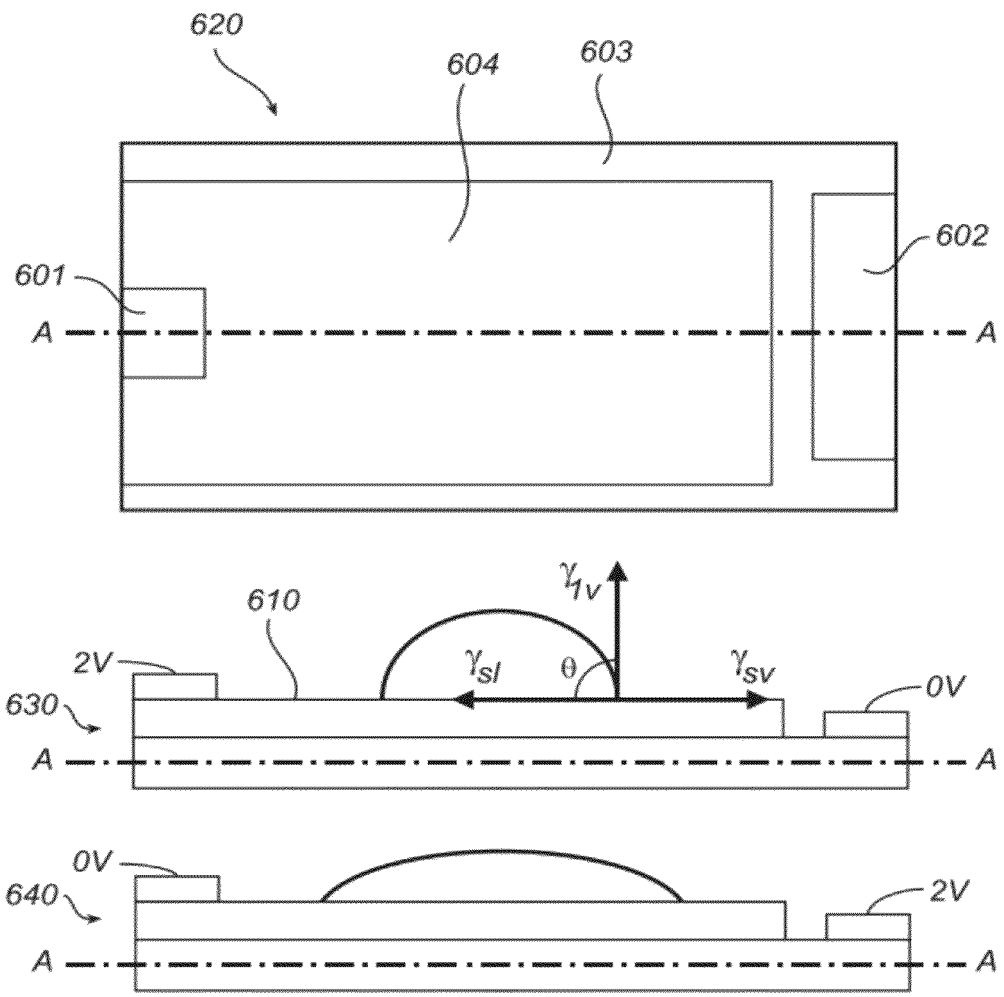
FIGS. 6a-6b and 7a-7b illustrate two structures used for experimentally characterizing the wettability switch. Further shown is the contact angle and the respective surface tensions forces affecting a water droplet.
Figure 6B:
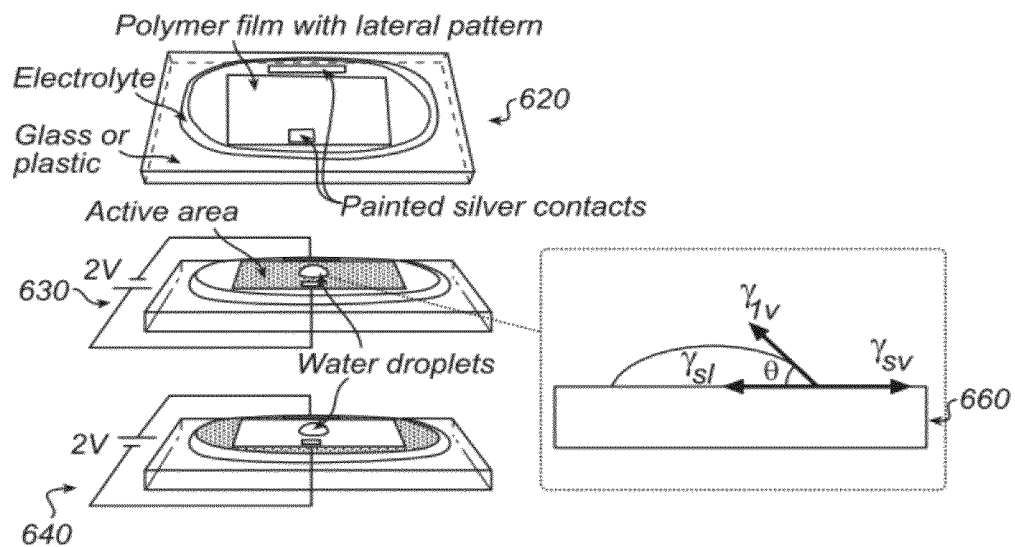
Figure 6C:
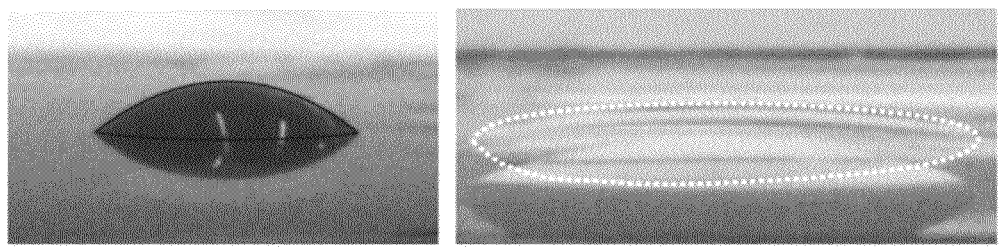
FIG. 6c is an enlarged photo of a droplet placed on the structure illustrated in FIGS. 6a-6b.
Figure 7A:
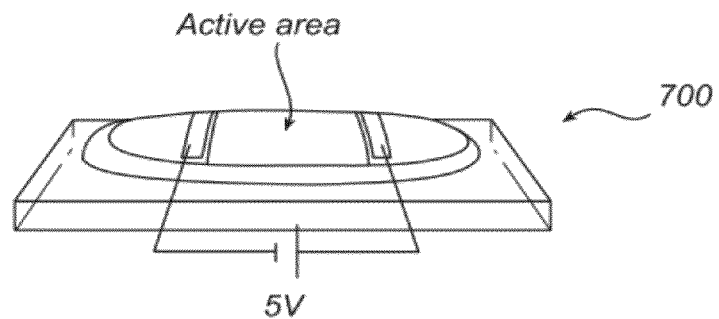
Figure 7B:
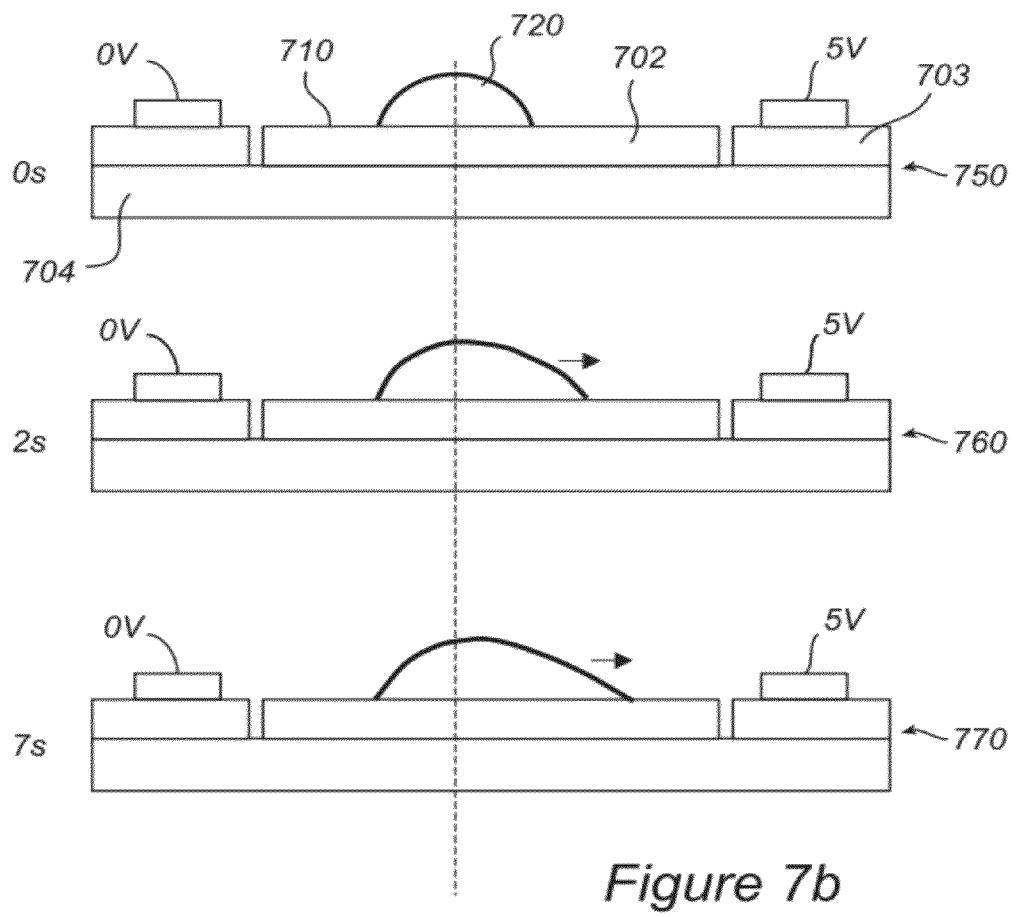
Figure 7C:
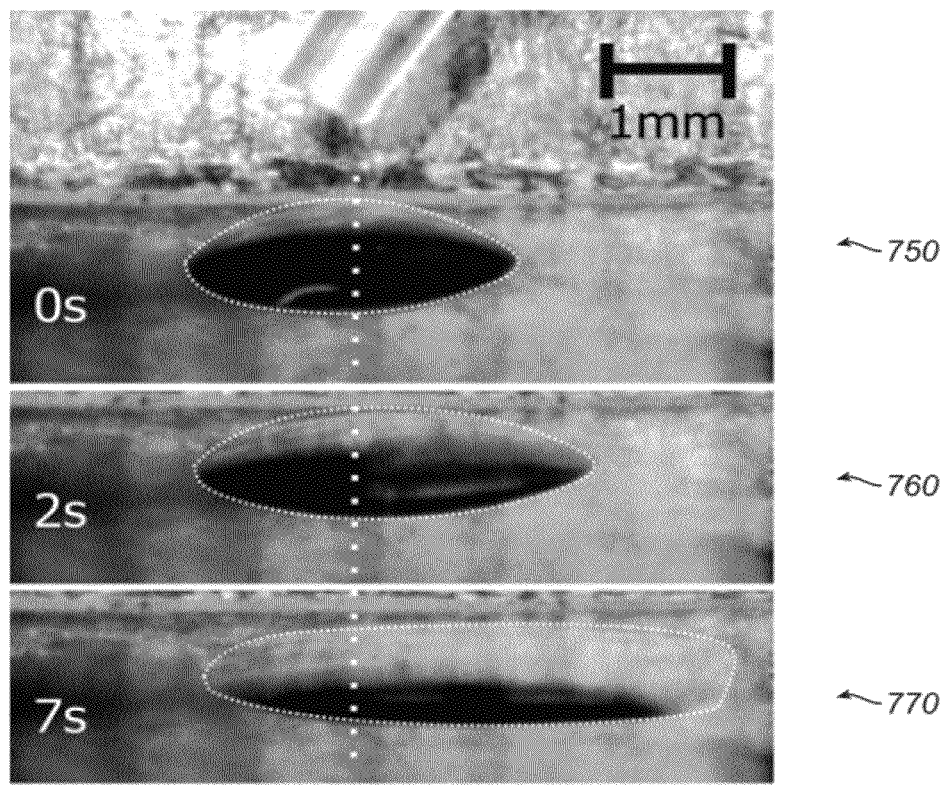
FIG. 7c is an enlarged photo of a droplet placed on the structure illustrated in FIG. 7a-7b.

Two different wettability switch structures were studied, as depicted in FIGS. 6a-6c (EWS-1) and FIGS. 7a-7c (EWS-2), respectively. The wetting areas of EWS-1 and EWS-2 (610 and 710, respectively) were both approximately 1 cm by 1 cm. The EWS-1 and EWS-2 devices were handled and measured with the wetting surface exposed to air (relative humidity 40%). The devices were provided with electrolyte elements residing on the opposite side of the polymer elements The devices were addressed via the polymer film and switched through the underlying electrolyte (as opposed to an electrolyte solution on the actual active area of the polymer), ordinary surface analysis techniques was used to study the properties of the surfaces in both the reduced and oxidized states.

Water contact angles (static) were measured manually using a goniometer (Ramé-Hart). Atomic force microscopy (AFM) images were taken using a Dimension 3100 (Digital Instruments). Photoelectron spectroscopy (PES) was performed using an ultra high vacuum system at a base pressure of 10-10 mbar. The spectrometer used for the measurements is equipped with a hemispherical electron energy analyzer and an $Al(K_\alpha)$-source at hv=1486.6 eV. The resolution of the spectrometer is such that the full width of the $Au(4f_{7/2})$ core level at half maximum is 1.7 eV.

FIG. 6b also illustrates a cross-section of a drop of water on a wetting surface and shows the surface tensions and the contact angle as defined in the Young-Dupré equation.

Experiments on EWS-1

FIGS. 6a and 6b schematically illustrates the EWS-1. The EWS-1 device thus comprises electrodes 601 and 602, an electrolyte element 603 and an electrochemically active polymer element 604 formed out of PANI. In FIG. 6a, reference numeral 620 indicates a top view. Reference numerals 630 and 640 indicates cross-sectional views of the same device having a water droplet on the wetting area 610. Reference numeral 630 illustrates the case when a positive voltage (2V) was applied to the polymer element 604. The PANI element then oxidized (y decreased, ideally to 0) and turned to blue-colored pernigraniline salt (having high water contact angle). Reference numeral 640 indicates the case when the voltage was reversed. The PANI element 604 was then reduced (y was nearly 1) and thus turned to the yellow-transparent leucoemeraldine state (having low water contact angle).

The EWS-1 structure thus provides a simple bi-stable exploiting the structure 2 concept described above.

The applied voltage caused homogeneous reduction (or oxidation) to occur at the negatively (or positively) addressed polymer element. A full red-ox switch took a few seconds while the associated memory time was on the order of several minutes.

Water contact angle (θ) measurements showed clear contrast between the three forms of polyaniline in the EWS-1 structure. The green emeraldine salt yielded a static water contact angle of θ=28° ±2° (10 (n) samples were studied). When the PANI element 604 was oxidized the water contact angle of water droplets added on the wetting surface increased to θ=37° ±2° (n=7), while the angle decreased to θ=9° ±2° (n=7) when the polymer was reduced. Photographs illustrating water droplets applied to reduced (right) and oxidized (left) PANI surfaces are shown in FIG. 6c.

Experiments on EWS-2

FIGS. 7a-7c illustrates an EWS-2 device 700, which operates according to the principle of Structure 3 above. The EWS-2 was thus divided into three adjacent polymer elements by means of a scalpel and consequently operated in a mode different form EWS-1. The polymer elements were thus constituted by two electrodes 701 and 703, and an intermediate polymer element 702 defining the wetting surface 710. The two peripheral electrodes were oxidized and reduced as for the EWS-1 case, but the ionic current between the two electrodes established a continuous electrochemical gradient in the center polymer film. A voltage of about 5V was required in order to obtain a clear wettability gradient in the intermediate polymer element 702. The highest degree of oxidation in the center element was reached in the area thereof that was closest to the negatively addressed electrode 701 (i.e. the cathode), and the highest degree of reduction was reached in the area that was closest to the positively addressed electrode 703 (i.e. the anode). As soon as the two electrodes were fully switched (and thus electrochemically saturated) the ionic current between the electrodes diminished and the electrochemical reaction stopped. Once stopped, the intermediate polymer element 702 and the electrolyte formed a closed electrochemical system (i.e. ionic and electronic current flowed between the elements), that gradually neutralized the reduced and oxidized states in the intermediate element which thus returned to its initial state. In effect, the gradient across the wetting surface 710 vanished gradually.

However, reference numerals 750, 760, and 770 indicates the propagation of a water droplet 720 (approximately 1 µl) arranged on the wetting surface at the instant the water droplet was applied, 2 seconds after, and 7 second after, respectively. As can be seen, the droplet 720 gradually propagated rightwards, towards the oxidized portion of the wetting surface. In total, the droplet mover approximately 1 mm before the electrodes were saturated and the electrochemical reaction stopped.

Further Experimental Structures

Panipol T was spin-coated on PEDOT:PSS on paper. A UV-curable electrolyte (containing Sericol Multiprint 090, Lithium trifluoromethane sulfonate, propylene carbonate, and phosphoric acid) was cast and cured on top of the PANI film. A second PANI film (50% Panipol T in toluen (wt/wt)) was spin-coated on top of the electrolyte. Silver contacts were painted on the PEDOT:PSS and the upper PANI-film. When a voltage was applied between the contacts, the upper PANI-film switched quickly. This experiment verified that rapidly switching vertical structures are readily provided for by exploiting the present invention.

Figure 12:
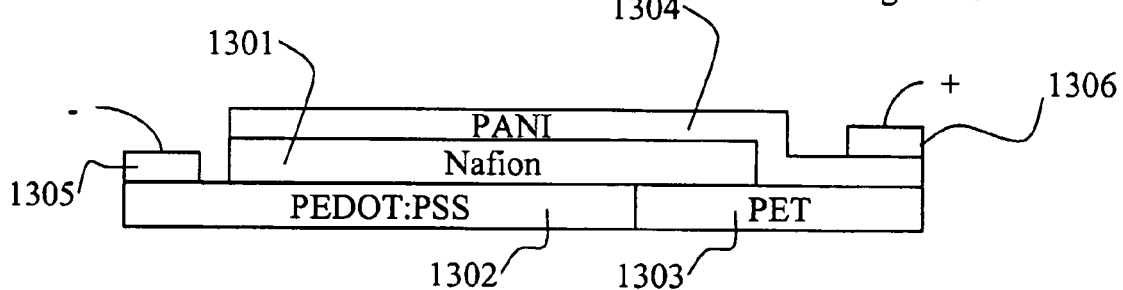
FIG. 12 illustrates a perspective view of an embodiment of the present invention, wherein Nafion is used as electrolyte.

Furthermore, as illustrated in FIG. 12, Nafion 1301 was cast on the edge of a PEDOT:PSS film 1302 (commercially available from Orgacon) on a plastic substrate 1303 and dried in 50° C. PANI (25% Panipol T in toluen (wt/wt)) was spin-coated on top of the electrolyte and out on the surrounding plastic substrate, forming an electrochemically active element 1304. Silver contacts 1305, 1306 were painted (Cu tape could alternatively have been used) on the PANI and PEDOT:PSS elements, respectively. When a voltage was applied between the contacts 1305, 1306, the PANI element 1304 switched. Differences in contact angles between reduced and oxidized PANI was seen but the measurements were uncertain since it was hard to completely switch the PANI with PEDOT as counter electrode.

Analysis

FIG. 6c illustrates water droplets (1.5 ml drop volume) adsorbed onto the active area of an EWS-1 device that is switched to the reduced (left hand photograph) and oxidized (right hand photograph) state respectively. FIG. 7c illustrates a time sequence of three photographs displaying a droplet added to the red-ox gradient of an EWS-2 device. Initially, the water droplet formed a relatively high water contact angle but when the surface was switched the droplet moved towards the fully reduced side of the gradient. Along the gradient, the transition from fully reduced to fully oxidized was continuous and close to linear with respect to the level of oxidation.

Figure 9:
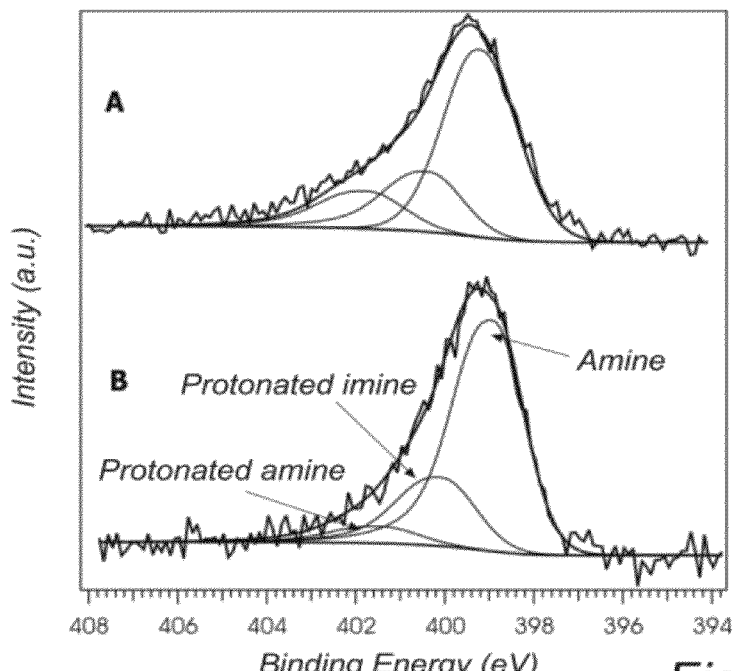
FIG. 9 is a diagram illustrating the nitrogen spectrum for PANI measured with a X-ray photoelectron spectroscopy (XPS). From the diagram it is apparent that amine are protonated in response to an oxidation process.

FIG. 9 illustrates deconvoluted narrow scans of the N(1 s) species from: (A) oxidized PANI and (B) reduced PANI. Three species are dissolved: amine, protonated imine and protonated amine. Binding energies are calibrated such that the C(1 s) core level is at 285.0 eV. The spectra were deconvoluted with three peaks corresponding to amine, protonated imine, and protonated amine. The overall doping level of the polyaniline films at the surface, defined as the relative intensity of the latter two peaks compared to the amine peak, was 42% for the oxidized films and 29% for the reduced films. The decrease in doping occurred primarily at the protonated amine sites as indicated by the decrease of the corresponding peak intensity in FIG. 9.

Given that DBSA molecules act as counter ions at the protonated nitrogen sites in PANI, with the $SO_3-$ group located closest to the polymer chain balancing the positive charge located around the protonated nitrogen (FIG. 5), the stoichiometric data indicated that there was slightly less than a monolayer of DBSA at the surface for both the (oxidized) protonated pernigraniline form and the (reduced) leucoemeraldine form (~5% sulphur content for both types of films), though some intermixing between the DBSA and the PANI chains at the surface could can not be ruled out. This suggests that a DBSA molecule that is decoupled from the PANI chain during reduction remains at the surface.

In an attempt to understand the underlying mechanism behind the wettability switch surfaces were measured using AFM (Atomic Force Microscopy) and PES (Photo-Electron Spectroscope). The former was used to explore the possibility that changes in micro-structured topography patterns on a surface were causing the change (the so-called Lotus effect). AFM images of the PANI surfaces of EWS-1 devices did not indicate any differences in topography between the reduced and oxidized state. (A surface roughness less than 15 nm was measured on a 20 by 20 µm area for all three redox states.) Therefore, topographical changes was ruled out as the origin of the wettability changes observed here. The same surfaces were characterized using PES, yielding several pieces of information. First, the measurement showed that the polyaniline was dedoped (reduced) by about 18 percentage points after spin-casting the emeraldine salt solution onto the electrolyte. At the same time, sodium ions diffused into the film from the electrolyte (~8% Na concentration at the surface vs. 0% in a PANI on an Au reference sample).

It might have been conceivable that some DBSA molecules leave the polymer surface and reach the droplet-air surface, decreasing $\gamma_{lv}$, and subsequently the water contact angle. To challenge this possibility, water droplets, mixed with 0.2 mg/ml DBSA were tested and showed differences in contact angles similar to those of pure water reported above. With DBSA on the liquid-vapor interface, the DBSA released by the PANI film should have an insignificant impact on $\gamma_{lv}$, indicating that changes in the liquid-vapor interface are not the origin of the wettability switching observed.

Figure 8:
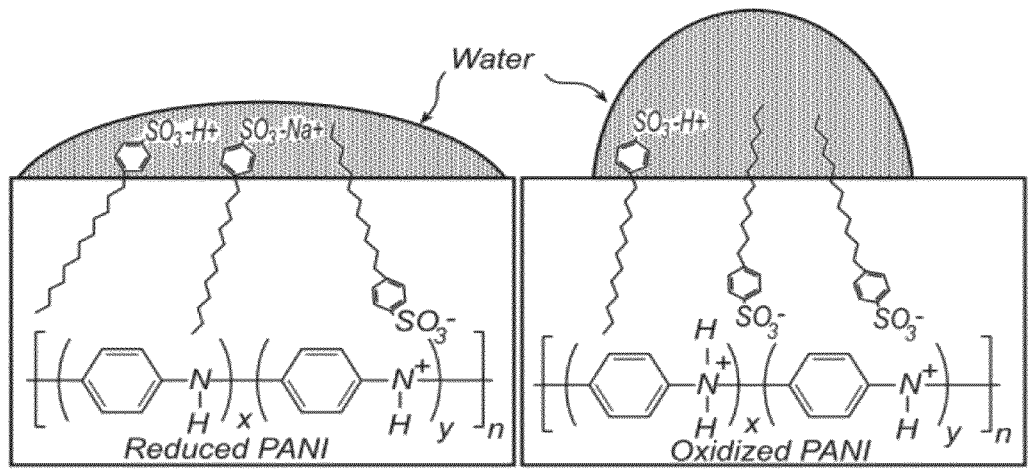
FIG. 8 illustrates a proposed mechanism providing for the switchable wetting properties in PANI that is doped with DBSA.

Wettability control on electrochemically active polymer surfaces is thus clearly a result of induced chemical changes at the surface upon electrochemical switching. We gathered some insight into the reasons by considering the expected chemistry occurring upon oxidation or reduction of the materials studied. FIG. 8 illustrates a plausible mechanism for wettability switching of the PANI film. When PANI is reduced, unbound DBSA molecules are free to orient their polar moieties towards the water. Upon oxidation, amine groups are protonated and more DBSA attach to the PANI chain via ionic bonding. This process decreases the amount of free polar sulfonic acid groups available at the surface and thereby increases the water contact angle. The imine groups are protonated in both red-ox states and the amine/imine ratio (x/y) stays roughly constant.

For PANI surfaces, a mechanism focused on the role of the DBSA counter-ions is thus plausible. Larger contact angles were measured for oxidized PANI than the other states. In the oxidized state, DBSA molecules are coupled to the PANI chain via an ionic bond to the sulfonic acid group, leaving the dodecyl chains to point out from the polymer backbone. Thus, we expect the dodecyl moieties to constitute the surface layer causing a relatively low $\gamma_{sv}$. When PANI is reduced, DBSA molecules are no longer locked to the PANI backbone and can thus rotate and move more freely, especially after a drop of water is added to the surface. With this added mobility, DBSA will likely rearrange so that a higher population of $SO_3^-$ groups (and fewer dodecyl chains) are exposed at the outermost surface, resulting in a decreased $\gamma_{sv}$. The excess DBSA in the PANI material used in these experiments left unbound DBSA during the redox reaction was thus free to rearrange in response to a water drop in all three redox states. Removal of this material might result in an even more effective switch.

Areas of Application

A matrix of wettability pixels as described above can be utilized for several applications, including for example the graphical printing and patterning industry, micro-fluidic devices, growth control of living cell clusters, and adsorption on biomaterials.

Figure 11:
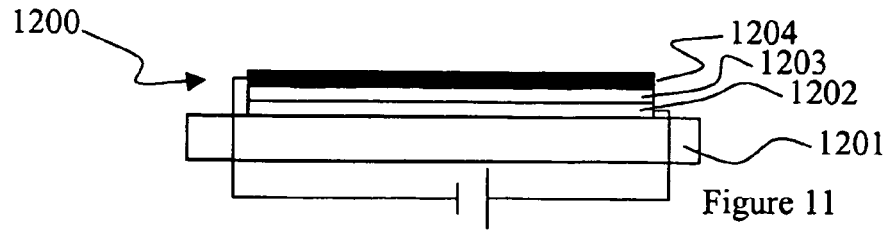
FIG. 11 illustrates a cross-section of an embodiment of the present invention, wherein the wettability switch comprises a number of layers that are stacked in a vertical structure.

A single wetting switch 1200 having a vertical structure (based on structure 2) is illustrated in FIG. 11. The wettability switch thus comprises a first electrochemically active element 1202 arranged on a support 1201. An electrolyte element 1203 is arranged on top of the first element 1202, and a second electrochemically active element 1204 is arranged on the electrolyte and defines a wetting surface.

Figure 10:
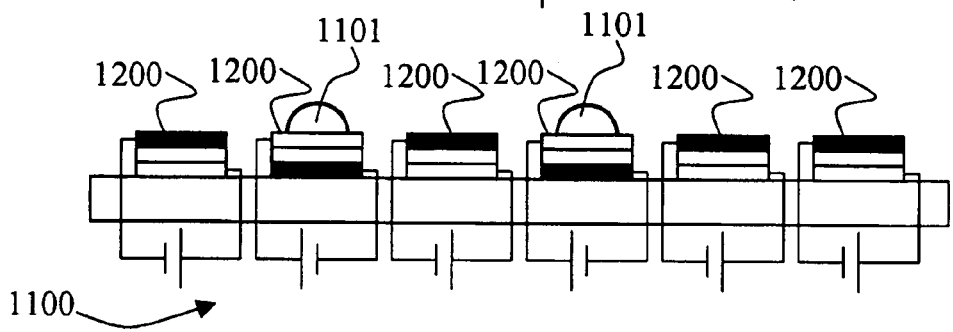
FIG. 10 illustrates a cross-section of one embodiment of the present invention, wherein an array of wettability switches are arranged on a substrate and thus form a surface having selectively switchable wetting properties.

A device 1200 us illustrated in FIG. 11 can be used separately or it can be combined into an array 1100 of wettability switches 1200 as illustrated in FIG. 10. Such an array 1100 can, for example, be used for selective adhesion of water droplets on lyophilic wetting surfaces only, leaving lyophobic wetting surfaces empty.

Electrochemical Printing Plate

An array 1100 as described above can, for example, be used as an electronically updateable printing plate, where the ink sticks to one state of the wetting surface but not to the other state. A structurally similar device is described in detail in WO02071139. The device described therein is directed to an electrochromic pixel device. However, by suitable choice of electrochemically active polymer and added surface active molecules, the device can actually operate as a wettability switch in combination with or instead of an electrochromic device. Basically, this can be facilitated by exploiting e.g. the electrochromic surface as wetting surface. Exploiting the teachings of WO02071139, the wettability switch can, of course, have either a vertical structure or a lateral structure (i.e. the electrochemically active elements and the electrolyte element may be stacked on top of each other forming an vertical configuration or the electrochemical elements may be arranged side by side forming a lateral configuration).

The addressing of such printing plate can be performed exploiting techniques well known from e.g. liquid crystal display addressing. The addressing can be performed either passively or actively. Active addressing typically requires an individual transistor element for each pixel. The transistor element might, for example, be of an electrochemically active type as referred to above and as described in WO02071505. An advantage using individual transistors and active addressing is that the updating speed can be increased substantially since a relatively high drive voltage can be supplied to all transistors in common and only a limited control signal is needed for each individual pixel. Using passive addressing the pixel circuitry (typically lines and rows) may give rise to voltage restrictions.

Alternatively, individually addressable wettability switches may be manufactured and distributed into a cylindrical grid encompassing an offset printing cylinder, facilitating digital offset printing.

Figure 13:
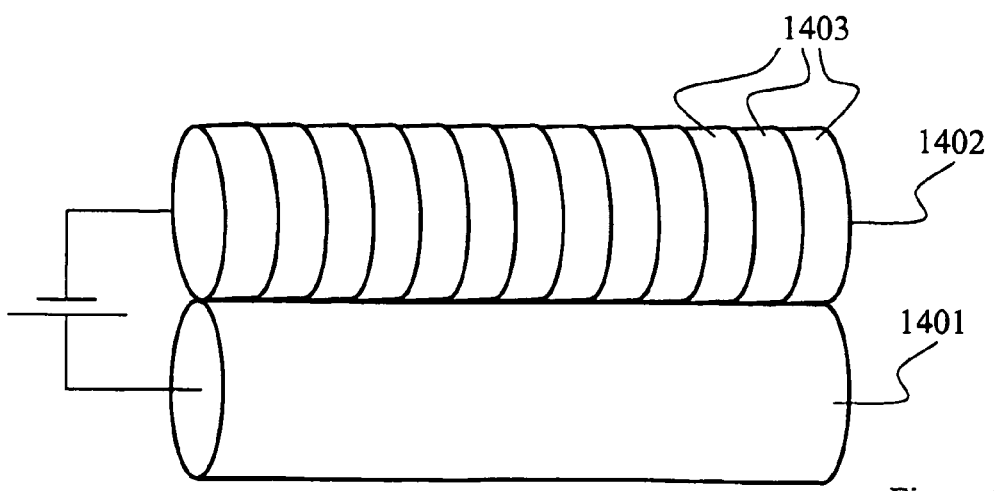
FIG. 13 illustrates an embodiment of the present invention employing cylindrical elements.

Such an arrangement is illustrated in FIG. 13. That particular arrangement comprises two cylinders, one electrolytic cylinder 1401 and one updatable cylinder 1402 carrying a large number of circumferential electrochemically active polymer elements 1403. The polymer elements 1403 are electrically separated from each other, and are separately addressable with individual drive voltages. By simultaneously rotating the cylinders and selectively addressing the polymer elements, the surface of the updatable cylinder is addressable in a 2-dimensional pattern. The resolution in the axial dimension is determined by the number of polymer elements 1403 and the resolution in the circumferential dimension is determined by the speed or rotation of the cylinders and by the addressing of the respective polymer elements.

The updatable cylinder can thus be used in a printing process by applying a printing agent on thereon, which thus organizes itself according to the wetting characteristics of the surface. The updatable cylinder 1402 can either be continuously updated during printing, allowing for a infinite length of the printed image, or it can be updated once and used for several revolutions, thus limiting the length of the printed image to the circumference of the cylinder.

An array of separately addressable wetting surfaces as described above, cylindrical as illustrated in FIG. 13 or essentially flat as illustrated in FIG. 10, can, of course, be used for any application requiring a surface having selectively addressable wetting properties.

Control of Cell-growth

Provided that cells prefer one of the lyophilic or the lyophobic state of the wetting surface, cell-growth could be controlled laterally by switching the wettability in some pixels out of an array of pixels.

Microfluidic Gates

Electronic wettability gates included in micro-fluidic systems could guide elements of water or analytes in a logic system for fluids. Microfluidic channels can, for example, be put on top of (or imprinted in) the polymer film. Each wetting surface may then work as a gate that either stops the water or lets it pass. Alternatively the switchable wetting properties may be exploited for propelling fluids in microfluidic systems. More complex guiding of the water may be achieved in combination with wettability gradients.

The invention claimed is:
1. A wettability switch, including an electrolyte element, and an electrochemically active element having a wetting surface with switchable wetting properties, said electrochemically active element comprising:
 an electrochemically active polymer, and
 surface active molecules each having a lyophobic portion and a lyophilic portion, wherein the electrochemically active element and the electrolyte element are in contact with each other, and are configured to exchange ions when exposed to an electric potential whereby a redox state of said electrochemically active polymer is altered, and wherein each of said surface active molecules exposes one of said lyophobic portion and said lyophilic portion towards said wetting surface, an identity of said one of said lyophobic portion and said lyophilic portion depending on a redox state of said electrochemically active polymer.

2. The wettability switch according to claim 1, further comprising an electrochemically active surface susceptible to electrochemistry.

3. The wettability switch according to claim 2, wherein said electrochemically active surface and said wetting surface are separate from each other.

4. The wettability switch according to claim 3, wherein said electrochemically active surface and said wetting surface are on essentially opposite sides of said electrochemically active element.

5. The wettability switch according to claim 2, wherein said electrochemically active surface and said wetting surface are spatially overlapping.

6. The wettability switch according to claim 1, whereby said electrochemically active element and said electrolyte element constitute an electrochemical system.

7. The wettability switch according to claim 6, wherein said electrolyte element is a solid electrolyte element.

8. The wettability switch according to claim 1, further comprising electrode circuitry formed of essentially same material as said electrochemically active element.

9. The wettability switch according to claim 1, further comprising electrode circuitry formed of a material including a metal.

10. The wettability according to claim 1, further comprising a transistor interconnected with said electrochemically active element, and configured to control a drive potential.

11. The wettability switch according to claim 10, wherein said transistor is formed of an electrochemically active polymer material.

12. The wettability switch according to claim 1, wherein the electrochemically active polymer is a film or a layer having two opposing surfaces, and wherein said wetting surface is on at least one of said two opposing surfaces.

13. The wettability switch according to claim 1, wherein said electrochemically active element is an electrically conductive polymer, and wherein said surface active molecules are doped in the electrically conductive polymer, and act as counter-ions in an electrochemical region in said electrochemically active polymer.

14. The wettability switch according to claim 13, wherein the electrochemically active polymer is a film or a layer having two opposing surfaces, and wherein said wetting surface is on at least one of said two opposing surfaces.

15. A wettability switch array, comprising:
at least two wettability switches according to claim 1, wherein the at least two wetting surfaces are separately controllable.

16. A cylindrical wettability device, comprising:
a plurality of wettability switches according to claim 1, wherein each electrochemically active element is arranged circumferentially around an updatable cylinder; and
an electrolyte cylinder having a surface covered with an electrolyte, wherein said updatable cylinder and said electrolyte cylinder rotate in contact with each other.

17. A printing plate, comprising:
the wettability switch according to claim 1.

18. A microfluidic device, comprising:
the wettability switch according to claim 1.

19. The microfluidic device according to claim 18, wherein the wetting surface of said wettability switch is configured to receive and carry a liquid both when said surface active molecules expose said one of said lyophobic portion and said lyophilic portion towards said wetting surface.

20. A cell-growth device, comprising:
the wettability switch according to claim 1.

* * * * *